March 21, 1950 R. W. JUSTICE 2,501,446
LIGHT POLARIZING APPARATUS FOR ANALYZING PICTURES
Filed April 8, 1947 2 Sheets-Sheet 2
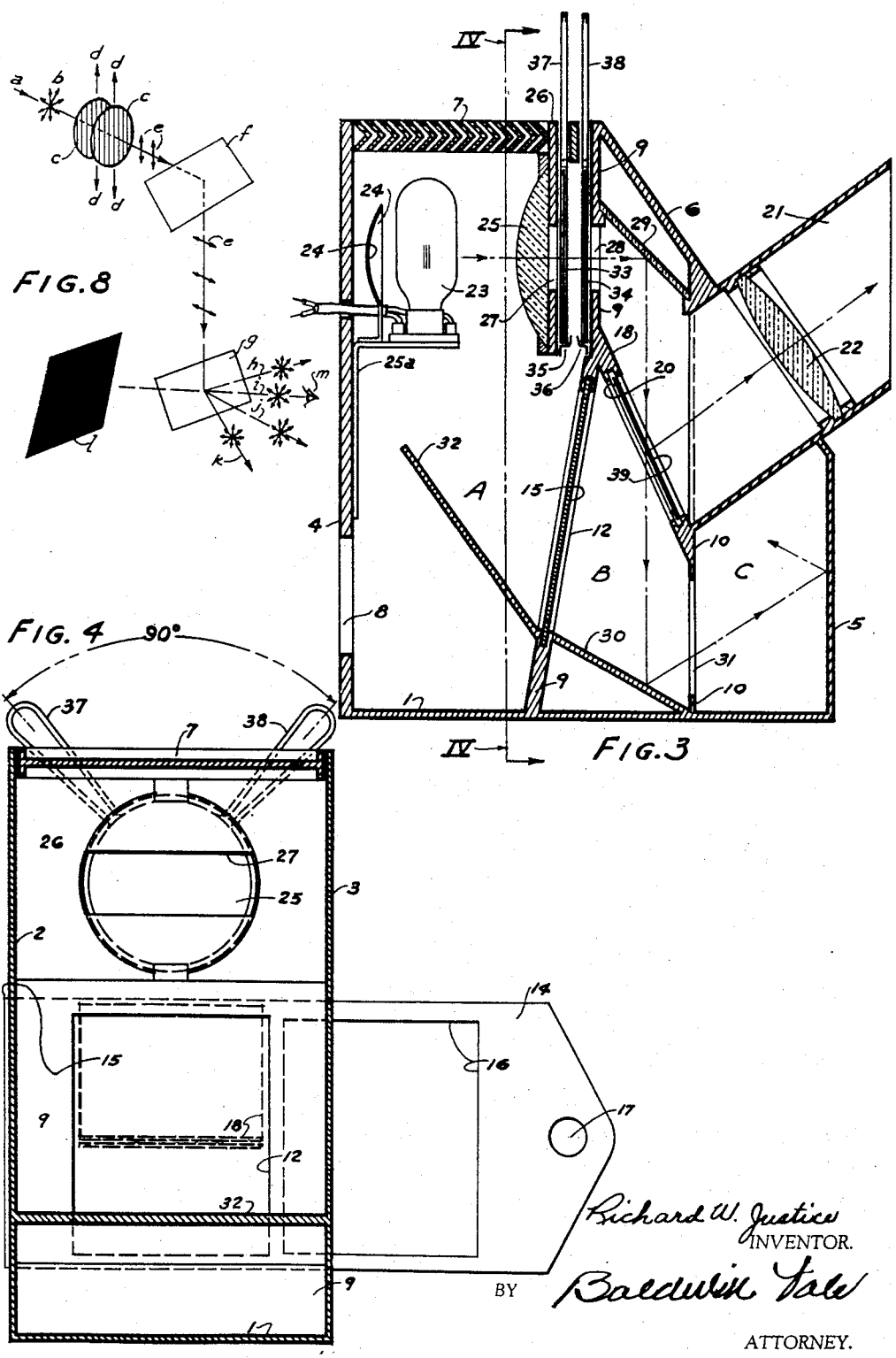

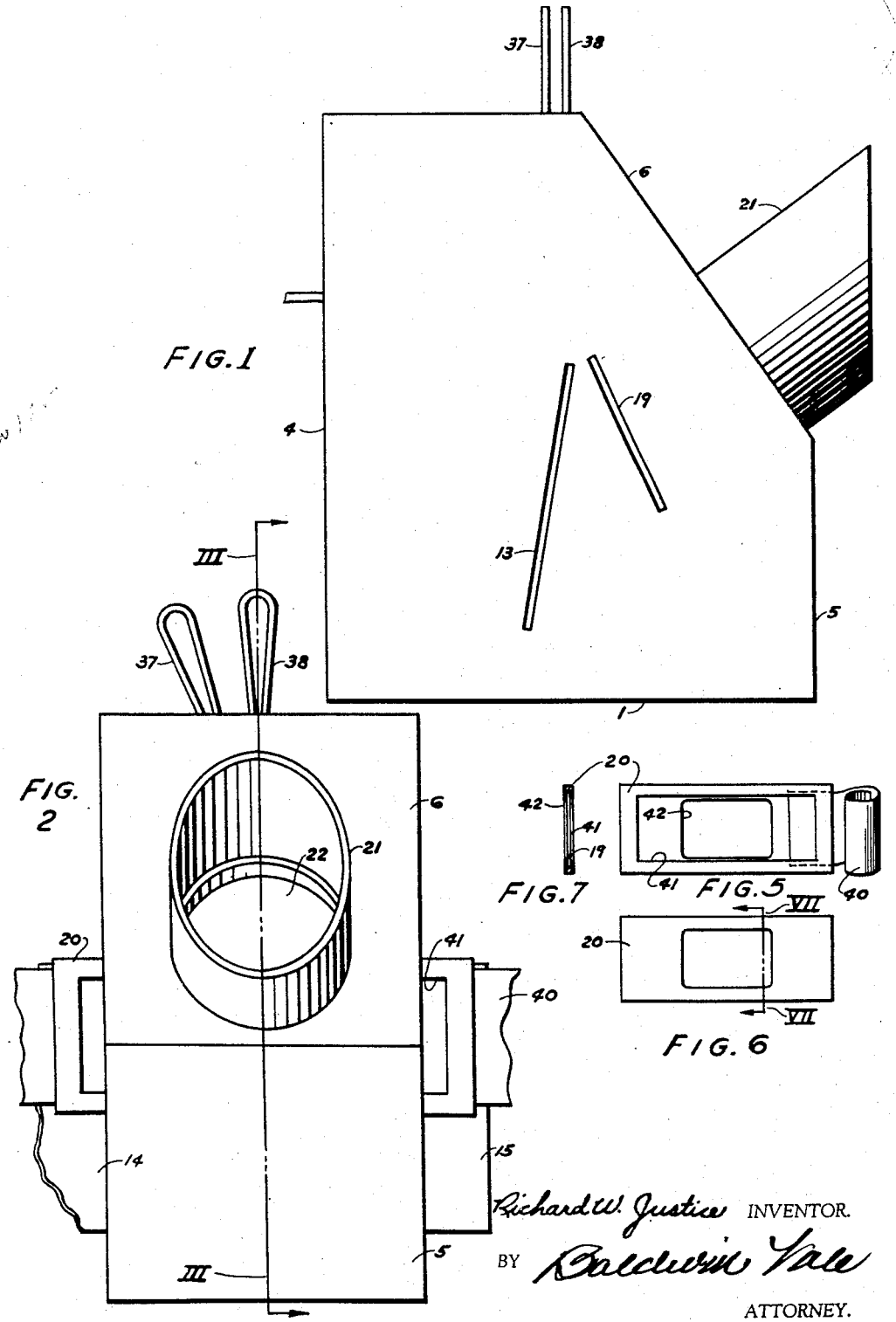

SEARCH ROOM

Patented Mar. 21, 1950

2,501,446

UNITED STATES PATENT OFFICE 2,501,446

LIGHT POLARIZING APPARATUS FOR ANALYZING PICTURES

Richard W. Justice, Belvedere, Calif.

Application April 8, 1947, Serial No. 739,987

2 Claims. (Cl. 88—1)

This invention relates to an optical analyzing apparatus and more particularly to means for evaluating photographic negatives.

The physical properties of a transparent photographic negative are such that it is difficult to determine by unaided observation, what the ultimate positive print from such a negative will disclose in details or artistic values.

Among the objects of this invention is the provision of means for modifying and controlling the light reflected to the eye from the image on a negative so that it appears as an enlarged positive image when viewed within the present apparatus.

Another object is the provision of control of polarization of the light rays illuminating the negative image and the elimination of glare from the light rays reflected from the surface of the negative so as to improve the quality and clarity of the positive image produced by the means hereinafter described.

Another object is to facilitate the selection of a desirable image for reproduction or enlargement, from a succession of images on a length of negative film.

Another object is the visual enlargement of either a positive or a negative image on photographic films of such diminutive area that the images are too small for accurate examination with the naked eye of the observer.

A further object is to provide a single instrument which will serve each of these purposes.

Other objects and advantages will appear as the description proceeds. In the specification and the accompanying drawings the invention is disclosed in its preferred form. But it is to be understood that it is not limited to this form, because it may be embodied in modifications within the spirit of the invention as defined in the claims following the description.

In the two sheets of drawings:

Fig. 1 is a side elevation of a photographic apparatus constructed in accordance with this invention.

Fig. 2 is a front elevation of the same.

Fig. 3 is a vertical section of the same taken on the line III—III, Fig. 2.

Fig. 4 is a similar view taken on the line IV—IV, Fig. 3.

Fig. 5 is a detail in front elevation of the film guide, drawn at smaller scale.

Fig. 6 is a rear elevation of the same.

Fig. 7 is a vertical section of the same, on the line VII—VII, Fig. 5.

Fig. 8 is an explanatory diagram in perspective.

In detail the structure shown in Figs. 3 and 4 comprises the enclosing case having the bottom 1, the sides 2, 3, the back 4, and the front 5 having the inclined upper portion 6, forming in effect a lightproof box, except for certain apertures. The top is closed by the light baffling ventilator 7 permitting the escape of air admitted through the lower opening 8 in the back wall.

The case is divided into compartments, A, B, C, by the interspaced main partition 9, and intermediary partition 10, extending from the bottom 1, to the top and between the sides 2, 3, respectively. The partition 9 has the aperture 12 therethrough and laterally alined with the slots such as 13 through the sides 2, 3, see Fig. 1. These slots receive the shutter slide 14 that is guided in the partition 9, and has the opaque end portions 14, 15 and the center aperture 16, adapted to register with the aperture 12 in the partition. So that the aperture 12 may be opened or closed at the will of the operator manually sliding the slide 14 by grasping the finger grip at 17.

The image frame 18 is interposed at an oblique angle between the partitions 9, 10 above the compartment B and in alinement with the slots such as 19 in the sides 2, 3, see Fig. 1, and is grooved to guide the upper and lower edges of the film guide 20, see Fig. 5. The plane of this frame 18 is centered on and transverse the axis of the speculum tube 21 extending outward from the partition 10 and through the inclined front 6 of the case. The magnifying lens 22 is fixedly mounted within the speculum in proper focal relation to the image frame 18.

The source of light comprises the incandescent bulb 23 and the reflector 24 mounted upon the bracket 25 A on the rear wall 4, and suitably connected with a source of power. The light condensing lens 25 is mounted between the side walls 2, 3, in focal relation to the source of light 23, on the plate 26 which has a preferably rectangular opening 27 therethrough. The partition 9 has a similar opening 28 therethrough and alined with the opening 27, for the passage of the substantially parallel light rays focused by the condenser.

The upper bright reflecting mirror 29 is mounted between the partitions 9, 10, with its plane at about 45 degrees to the axis of the condenser 25 so that the reflected rays are projected vertically downward through the image frame 18, onto the inclined light absorbent black surface 30 which absorbs most of the light and deflects the unabsorbed light through the opening 31 in the partition 10, where they are lost within the black chamber C, beneath the speculum 21.

The interior walls of the chambers A, B are dark so that substantially all of the rays from the bulb 23 are absorbed therein without concentration. Rays striking the lower white angular reflector 32, substantially parallel with the image frame 18 and extending outward and upward from the partition 9 are reflected through the aperture 12 in the partition 9, and substantially parallel with the axis of the magnifying lens 22 in the speculum.

The light rays passing through the condenser 25 are modified by the polarizing screens 33, 34 which are guided in the substantially semicircular guides 35, 36 respectively mounted on the partition 9 and the plate 26. These screens are moved relatively to each other by the handles 37, 38 thereon respectively and projecting above the top of the case for manual rotation about their common planar axis, and consequent rotation of their respective axes of polarization about this same planar axis.

The axes of polarization of these screens 33, 34, are parallel to the handles 37, 38. When the handles are vertically aligned, as in Fig. 3, as much light is passed by the screens as may be passed by the same two screens in any position whatever, and this light falls on to mirror 29. But when the handles are set at ninety degrees to each other, as in Fig. 4, substantially all the rays are cut off from the mirror by the screens. It is thus possible to selectively diminish the volume of light reaching the mirror 29 by moving either handle, seperately, away from the vertical position or by moving both in opposite directions away from the vertical position. Generally the optimum viewing conditions will be achieved when the handles are aligned vertically, as under this condition the light reflected from the mirror will cause virtually no glare when reflected through the speculum 21 from the surface of a negative 39 disposed within the image frame 18.

Fig. 8 diagrammatically shows the principle utilized in this invention to eliminate glare from the negative, the light and dark values of which it is desired to transpose. A ray of light, a, is composed of vibrations in all directions in each plane at right angles to its path. Such vibrations are indicated as at b. Upon passing through one or more polarizing screens, c, whose axes of polarization lie in the direction of the double ended arrows, d, the light becomes polarized, and of the vibrations in the many directions as shown at b, only the components parallel to the axes of polarization of the screens have been passed by the screens, as shown at e.

After the path, but not the character, of the ray has been changed in direction by the mirror f, it falls upon film g, the surface of which is composed of areas of a metallic silver compound in varying density, and through which metallic deposits more or less of the smooth shiny film backing is visible. This completely polarized light passes through those parts of the film having no metallic particles thereon, without appreciable reflection therefrom. Almost all of the light which falls upon those portions of the film upon which the metallic particles are thickest is reflected, due to the microscopic roughness of the metallic deposit, diffusely in many directions, as shown by arrows h, i, j, k, while a minute portion of the light passes through the film. Between the two extremes of opacity, each microscopic area of the film passes some proportion of the light falling upon it and reflects some proportion, but no area reflects any appreciable amount of glare light, since the light falling upon it was vibrating in one direction only, and glare light is that part of reflected light vibrating parallel to the reflecting surface only. No such light falls upon the reflecting surface of the film, hence no such light can be reflected from it.

To the eye of an observer, as at m, the image on the negative now appears reversed because each small area is highlighted in direct proportion to the density of the metallic deposit, and is transparent in inverse proportion to the density of the deposit. Since the black background 1 is visible through the glareless surface of the transparent film, the more transparent each small film area, the darker it will appear, thereby giving an impression of a reversal of the true light and dark values of the negative.

The film holder 20, shown in Figs. 5, 6, 7, comprises a flat tubular frame composed of a material, such as plastic, that will not scratch the emulsion image on the film 40. One wall of the film holder has a long field opening 41, for convenience in adjusting the desired image on the film in registry with the small opening 42 in the opposite wall, representing the true metric area of the image. For instance a 35 millimeter film has an image area approximately 1 x 1½ inches, too small to disclose photographic details to the naked eye. It is therefore easier to place an image in registry with the smaller aperture 42 if portions of the adjoining images are visible through the larger aperture 41.

The film holder and guide 20 with an end of the film 40 therein is entered into the slot such as 19 until the aperture 42 comes into the focal field of the magnifying lens 22 in the speculum. The film is then pushed through the film holder 20, so that each image may be examined by magnification, regarding its photogenic qualities for positive printing.

When used for its primary purpose of viewing a negative to determine the probable appearance of a proposed enlarged positive print, this invention operates substantially as follows: In a photo-negative the lights and darks are in reverse order to the original object photographed. That is, the lights of the object appear as darks on the transparent negative. The light normally coming through the negative from behind accentuates the transparent portion and diminishes the dark portion and minimizes detail. Since light is the dominant element in the negative, the image on the film takes on a phantomlike appearance when viewed with the naked eye.

The dark portions of the image on the negative film, being in the nature of a deposit of microscopic particles of a metallic silver compound, have a relatively high reflective quality that contributes to the functioning of this invention.

Referring to Fig. 3, any one of the substantially parallel rays on striking the mirror 29 is reflected downward and, on striking a relatively transparent portion of the negative image at 39 is partially reflected therefrom and partially lost by passing on through the negative. A similar ray striking a relatively dark portion of the negative is lost through the negative to a very slight degree, and a large part of the intensity is reflected therefrom and into the speculum tube and is magnified by the lens 22 for the observer. However such reflected light is confusing to the eye until the light absorbing black portion of the shutter slide 15 closes the aperture 12 and blocks off the reflected light from the reflector 32. An image produced from a negative by such means, without the use of polarizing screens, while exhibiting transposed or reversed light and dark values, is lacking in clarity and definition due to glare on the surface of the film.

It is the function of the polarizing screens 33, 34 to polarize the light rays which have passed through the condenser 25 so as to prevent glare in the reflection from the negative image at 39. The controlled volume of light and its modification by the polarizing screens by selective control has been described above. When the glare from the negative image is thus controlled, the image then appears more plainly as a positive, resembling a positive paper print from said negative, enlarged by the magnifying lens 22, as an aid to the naked eye of the observer at the outer end of the speculum 21.

The invention is equally advantageous in viewing and evaluating positive transparencies of film in colors or black and white, such as used in projecting machines. In this instance the length of film is fed through the holder 20 as described, but the slide 14 is advanced until the aperture 16 registers with the aperture 12 in the partition 9. This permits the diffused light within the chamber A, reflected by the reflector 32, to pass through the transparent film at 39, as it would in a projecting machine. The image on the film would not, in this case, be illuminated by the light from the mirror 29 as the two polarizing screens would have been rotated until their relation to one another would be as shown by the positions of the handles 37 and 38 in Fig. 4, thereby causing the screens to act, jointly, as an opaque material, which is a well known property of polarizing screens in pairs so rotated with respect to one another.

The enlarged image would then appear to the eye of the observer much as it would appear when given back by the reflecting screen of a slide projecting apparatus.

The heat incidental to the source of light 23 is dissipated from the enclosing case by thermo-circuation. The rising heat waves passing through the baffle top at 7, aspirate air at room temperature through the lower inlet 8 in the rear wall of the case.

Having fully described this invention and its mode of operation what I claim and desire to secure by Letters Patent is:

1. An optical analyzing apparatus comprising an enclosing case having main and intermediary partitions dividing said case into light, intermediary and front compartments, said light compartment having a light baffling ventilated top and said main partition having a lower aperture closed by a slide; an image carrying frame interposed at an angle in said intermediary compartment and having a film guide therein between the sides of said case; a magnifying speculum tube in said case in focal relation to the plane of said image carrying frame; a concentrated light source in said light compartment; a bright upper reflector in said intermediary compartment set substantially parallel to the plane of said image carrying frame and angularly to the axis of said speculum tube for deflecting light from said light source to said image carrying frame; a lower reflector in said light compartment at an angle to the plane of said lower aperture in the main partition for reflecting light from said light source through said lower aperture on to the rear area of said image carrying frame; a light reducing reflector beneath said image frame for deflecting the unabsorbed light through an aperture in said intermediary partition into said front compartment; and a plurality of light polarizing screens rotatable relatively to each other within said case and interposed between said light source and said bright upper reflector in said intermediary compartment.

2. A light polarizing apparatus for analyzing pictures comprising an enclosing case having main and intermediary partitions dividing said case into light, intermediary and front compartments, said main partition having a lower aperture; a slide guided in said case for opening and closing said lower aperture; an image carrying frame interposed at an angle in said intermediary compartment and having a film guide therein between the sides of said case; a magnifying lens in said case in focal relation to the plane of said image carrying frame; a light condenser in said light compartment; a bright upper reflector in said intermediary compartment and set substantially parallel to the plane of said image carrying frame and angularly to the axis of said magnifying lens for deflecting light from said light source to said image carrying frame; a lower reflector in said light compartment at an angle to the plane of said lower aperture in the main partition for reflecting light from said light source through said lower aperture onto the rear area of said image carrying frame; and a light reducing reflector beneath said image frame for deflecting the reduced light through an aperture in said intermediary partition and into said front compartment; and a plurality of light polarizing screens rotatably mounted relatively to each other within said case and interposed in the path of light from said light condenser.

RICHARD W. JUSTICE.

REFERENCES CITED

The following references are of record in the file of this patent:

UNITED STATES PATENTS

| Number | Name | Date |
| --- | --- | --- |
| 632,026 | Smith | Aug. 29, 1899 |
| 1,859,756 | Tillyer | May 24, 1932 |
| 2,146,506 | Maisch | Feb. 7, 1939 |
| 2,111,376 | Isbell | Aug. 13, 1940 |
| 2,372,430 | Kals | Mar. 27, 1945 |

FOREIGN PATENTS

| Number | Country | Date |
| --- | --- | --- |
| 839,173 | France | Dec. 26, 1938 |
| 509,308 | Great Britain | July 11, 1939 |